(12) United States Patent
Gollier

(10) Patent No.: US 7,742,222 B2
(45) Date of Patent: Jun. 22, 2010

(54) CONVERSION DEVICE WITH MULTI-FACETED OUTPUT FACE AND LASER PROJECTION SYSTEM INCORPORATING THE SAME

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 63 days.

(21) Appl. No.: 12/072,981

(22) Filed: Feb. 29, 2008

(65) Prior Publication Data

US 2009/0219954 A1    Sep. 3, 2009

(51) Int. Cl.
G02F 1/35    (2006.01)
G02F 2/02    (2006.01)
G02B 6/10    (2006.01)
G02B 6/12    (2006.01)
H01S 3/10    (2006.01)

(52) U.S. Cl. .................. 359/332; 359/326; 385/14; 385/122; 385/131; 385/132; 372/22

(58) Field of Classification Search ......... 359/326–332; 385/14, 122, 129–132; 372/22
See application file for complete search history.

(56) References Cited

U.S. PATENT DOCUMENTS

| 4,838,638 | A | 6/1989 | Kamiyama et al. | |
|---|---|---|---|---|
| 5,119,458 | A | 6/1992 | Okamoto et al. | |
| 5,619,369 | A | 4/1997 | Yamamoto | 359/332 |
| 5,909,456 | A | 6/1999 | Oka | 372/22 |
| 5,970,077 | A | 10/1999 | Hill | 372/23 |
| 6,181,461 | B1 | 1/2001 | Wada et al. | 359/326 |
| 2004/0233512 | A1* | 11/2004 | Fujioka et al. | 359/326 |
| 2006/0109542 | A1 | 5/2006 | Mizuuchi et al. | |
| 2006/0165138 | A1 | 7/2006 | Kachanov et al. | 372/21 |
| 2007/0171951 | A1 | 7/2007 | Cho | |
| 2009/0190624 | A1* | 7/2009 | Almoric et al. | 372/107 |

FOREIGN PATENT DOCUMENTS

| EP | 1 801 625 A1 | 6/2007 |
|---|---|---|
| GB | 2 260 872 A | 4/1993 |

* cited by examiner

*Primary Examiner*—Daniel Petkovsek
(74) *Attorney, Agent, or Firm*—Kwadjo Adusei-Poku

(57) ABSTRACT

The present invention relates generally to multi-faceted wavelength conversion devices and laser projection systems incorporating the same.

20 Claims, 2 Drawing Sheets

CONVERSION DEVICE WITH MULTI-FACETED OUTPUT FACE AND LASER PROJECTION SYSTEM INCORPORATING THE SAME

BACKGROUND OF THE INVENTION

The present invention relates generally to semiconductor lasers and, more particularly, to wavelength conversion devices with multi-faceted output faces and laser projection systems incorporating such conversion devices.

SUMMARY OF THE INVENTION

The present invention relates generally to semiconductor lasers, wavelength conversion devices, and the other optical components that can be used in laser projection systems including a short wavelength source. Short wavelength sources can be configured for use in a laser projection system by combining a single-wavelength semiconductor laser, such as, for example, a distributed feedback (DFB) laser, a distributed Bragg reflector (DBR) laser, or a Fabry-Perot laser, with a wavelength conversion device, such as, for example, a second harmonic generation (SHG) crystal. The SHG crystal can be configured to generate higher harmonic waves of the fundamental laser signal by tuning, for example, a 1060 nm DBR or DFB laser to the spectral center of an SHG crystal, such as, for example, MgO-doped periodically poled lithium niobate (PPLN), which converts the wavelength to 530 nm.

The output of the SHG crystal can be influenced significantly by parasitic light generated as the fundamental signal propagates through the waveguide region of the wavelength conversion device. More specifically, referring to FIGS. 1 and 2, the geometrical configuration of a PPLN crystal or other type of wavelength conversion device 10 will typically define a waveguide region 12 formed by a relatively thin layer of periodically poled $LiNbO_3$ or other suitable second harmonic generating material sandwiched between two low index cladding layers 14. Two optical trenches 16 extend between the input face 11 and the output face 13 of the device along the propagating direction and guide the propagating signal in a relatively linear waveguide portion 12A of the waveguide region 12 by helping to confine the propagating modes into the relatively linear waveguide portion 12A and to limit propagation in the lateral planar waveguide portions 12B of the waveguide region 12. Typically, the dimensions of the relatively linear waveguide portion 12A are on the order of a few microns in the vertical direction and less than ten microns in the lateral direction, although dimensional variations from these references are contemplated. With the exception of the multi-faceted output face 13 described herein, the particular manner in which the various layers of the wavelength conversion device are assembled to form the wavelength conversion device 10 is beyond the scope of the present invention. Indeed, a variety of conventional and yet to be developed wavelength conversion devices comprising the relatively linear waveguide portion 12A and the lateral planar waveguide portions 12B may be utilized in practicing the present invention. In some embodiments, the low index cladding layers 14 are attached to respective blocks of $LiNbO_3$. Alternative second harmonic generating materials include, for example, other suitable conventional or yet-to-be developed non-linear optical materials, photonic crystal slabs, chiral materials, etc.

The present inventors have recognized that light propagating in the relatively linear waveguide portion 12A is typically subject to significant scattering. As is illustrated in FIG. 2, most of the stray light will escape from the relatively linear waveguide portion 12A but will remain mostly trapped in the pair of lateral planar waveguide portions 12B. As a consequence, as is illustrated schematically in FIG. 2, the near field of the wavelength conversion device comprises a bright emitting spot 15 made of the light that propagated without scattering and laterally distributed parasitic light 17 made of the light that has been scattered and trapped into the lateral planar waveguide portions, which is also referred to herein as stray light 17.

The shape of the stray light 17 depends upon the manner in which light propagates in the wavelength conversion device 10. When an optical signal propagating along the relatively linear waveguide portion 12A is scattered, part of the light is transferred to the lateral planar waveguide portions 12B of the waveguide region 12 where the propagating modes are much less confined. The effective index of refraction in the lateral regions, which is much closer to that of the bulk material of the device 10, effectively defines one preferential angle at which all scattered waves are in phase. This angle is given by the following relation:

$$\cos\theta = {\eta_{EFF}}/{\eta_E}$$

where $\theta$ is the scattering angle, $\eta_{EFF}$ is the effective index in the relatively linear waveguide portion 12A, and $\eta_E$ is the effective index in the lateral planar waveguide portions 12B of the waveguide region 12.

As a result of this scattering, the present inventors have recognized that the typical far field of the wavelength conversion device 10 includes a few well-defined lateral intensity peaks, each corresponding to the scattering angles of the modes supported by the relatively linear waveguide region 12A. These lateral intensity peaks can disrupt the performance of many short wavelength laser projection systems. The present inventors have recognized potentially beneficial schemes for reducing the impact of these lateral intensity peaks in laser projection systems utilizing wavelength conversion devices that are susceptible to the aforementioned parasitic or stray light.

According to one embodiment of the present invention, a laser projection system is provided comprising a laser source, a wavelength conversion device, and beam projection optics. The output face of the wavelength conversion device comprises a multi-faceted output face comprising a core facet and at least two lateral facets. An optical signal propagating along the relatively linear waveguide portion will be subject to a degree of scattering so as to define a relatively high intensity spot in substantial alignment with the relatively linear waveguide portion of the waveguide region along the core facet of the output face and relatively low intensity laterally distributed parasitic light in substantial alignment with lateral planar waveguide portions of the waveguide region along the lateral facets of the output face. The lateral facets of the output face of the wavelength conversion device are oriented to project the relatively low intensity laterally distributed parasitic light in directions that are distinct from a direction in which the relatively high intensity spot is projected through the core facet. Further, the beam projection optics are structured to discriminate between the laterally distributed parasitic light and the relatively high intensity spot so as to favor projection of relatively high intensity optical signals towards an image field of the laser projection system.

According to another embodiment of the present invention, multi-faceted wavelength conversion devices are provided without limitation of their field of use to laser projection systems.

BRIEF DESCRIPTION OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
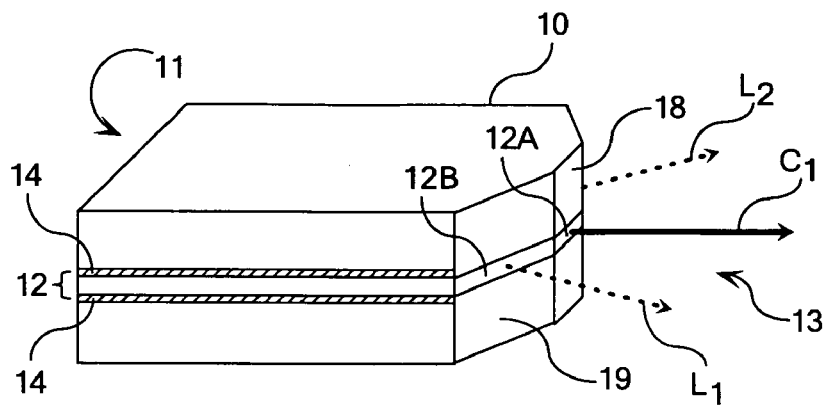
FIG. 1 is a schematic illustration of a wavelength conversion device according to one embodiment of the present invention.
Figure 2:
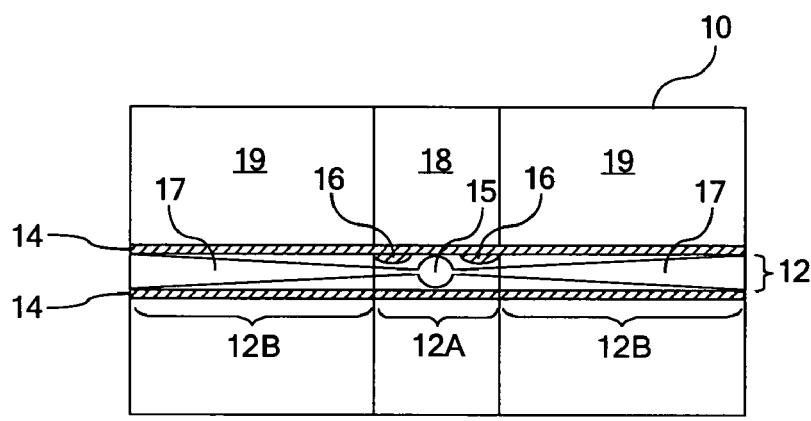
FIG. 2 is a schematic illustration of the output face of a wavelength conversion device illustrated in FIG. 1.
Figure 3:
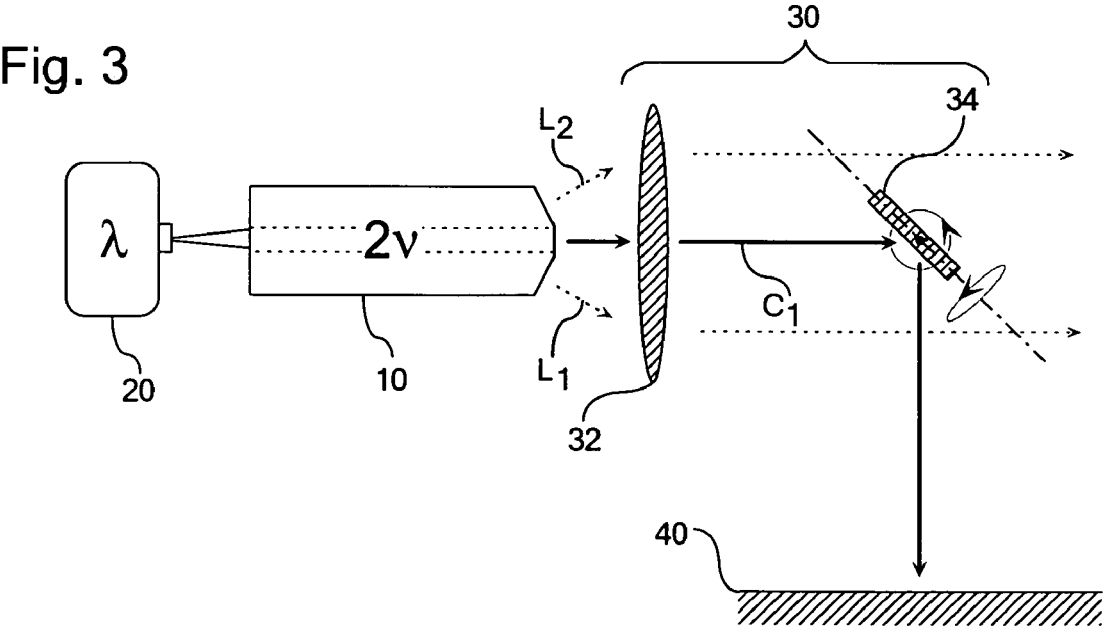
FIG. 3 is a schematic illustration of a laser projection system according to one embodiment of the present invention.

Referring to FIGS. 1-3, the concepts of the present invention may be conveniently illustrated with general reference to a laser projection system 100 comprising the wavelength conversion device 10, a laser source 20, and beam projection optics 30 comprising, for example, a collimating lens 32 and a scanning mirror 34. The laser source 20 may comprise any of a variety of types of semiconductor or non-semiconductor lasers, including those noted above. Similarly, the beam projection optics 30 can embody a variety of scanning and non-scanning optical configurations from the relatively simple to the relatively complex including, for example, a two-axis, gimbal mounted, MEMS scanning mirror 34 configured to cooperate with the laser source to generate a two-dimensional single or multi-color scanned laser image on a projection screen 40 in the image field of the laser projection system 100. It is also contemplated that the beam projection optics can be configured as part of non-scanning optical systems such as spatial light modulator based systems (including digital light processing (DLP), transmissive LCD, and liquid crystal on silicon (LCOS) systems).

The light beam emitted by the semiconductor laser 20 can be either directly coupled into the waveguide of the wavelength conversion device 10 or can be coupled through collimating and focusing optics or some other type of suitable optical element or optical system. The wavelength conversion device 10 converts the incident light into higher harmonic waves and outputs the converted signal. As is noted above, this configuration is particularly useful in generating shorter wavelength laser beams from longer wavelength semiconductor lasers and, as such, can be used as a visible laser source for a single-color laser projection system or for a multi-color RGB laser projection system.

The wavelength conversion device 10 comprises an input face 11, an output face 13, and the aforementioned waveguide region 12 extending from the input face 11 to the output face 13. The relatively thin waveguide region 12 is sandwiched between two lower index layers 14 to ensure light confinement in the vertical direction of FIG. 2. Two optical trenches 16 extend partially into the waveguide region 12 to help confine light in the lateral direction and define a relatively linear waveguide portion 12A of the waveguide region 12. Typically, most of the light emitted by the laser 20 is coupled into and remains confined in the relatively linear waveguide portion 12A. However, as light propagates in the relatively linear waveguide portion 12A, part of it is converted to a higher frequency through non linear optical effects. Roughness and other irregularities and imperfections in the relatively linear waveguide portion 12A generate scattering of the frequency-converted light, which results in some leakage of power from the linear waveguide portion 12A. The low index layers 14 confine most of the scattered light in the lateral planar waveguide portions 12B located on both sides of the relatively linear waveguide portion 12A. The resulting near field pattern at the output of the wavelength conversion device 10 comprises a relatively high intensity spot 15 corresponding to the light that has not been scattered and relatively low intensity laterally distributed light 17 corresponding to the scattered or stray light.

One interesting property of that stray light is associated with the fact that light does not propagate at the same speed in the relatively linear waveguide portion 12A and the lateral planar waveguide portions 12B because both waveguide portions have different structures. As a consequence, the stray light is preferentially emitted in one direction corresponding to an angle where the scattered light is in phase with the light that is propagating into the linear waveguide. That angle is given by the following equation:

$$\cos\theta = \eta_{EFF}/\eta_E$$

where $\theta$ is the scattering angle inside the crystal material, $\eta_{EFF}$ is the effective index in the relatively linear waveguide portion 12A, and $\eta_E$ is the effective index in the lateral planar waveguide portions 12B, which is very close to the index of the bulk material. These preferential emission angles result in a far field pattern that comprises a central lobe, resulting from light that is not scattered, in combination with a few lateral lobes, resulting from the scattered light. The fact that more than one single lateral lobe is visible is due to the fact that the waveguide may sometimes support multiple modes having different effective indices ($\eta_{EFF}$). By taking typical waveguide materials and geometries, the preferential scattering angle is smaller than the angular width of the central lobe. As a result, scattering peaks are superimposed on the otherwise useful central lobe, making it difficult to filter the parasitic light from the useful unscattered light using, for example, spatial filters in the far field of the device.

As is illustrated with further reference to FIGS. 1 and 3, to help alleviate the above-noted problems associated with the laterally distributed parasitic or stray light 17, the output face 13 comprises multiple facets, i.e., a core facet 18 and at least two lateral facets 19. The relatively high intensity spot 15 is aligned along the core facet 18 while the relatively low intensity laterally distributed parasitic light 17 is aligned along the lateral facets 19. The lateral facets 19 of the output face of the wavelength conversion device are oriented to project the relatively low intensity laterally distributed parasitic light 17 in directions $L_1$, $L_2$ that are distinct from a direction $C_1$ in which the relatively high intensity spot 15 is projected through the core facet 18.

Given these distinct projections for each type of light, the beam projection optics 30 can be structured to discriminate between the laterally distributed parasitic light 17 and the relatively high intensity spot 15 so as to favor projection of relatively high intensity optical signals towards a projection screen 40 in the image field of the laser projection system 100. For example, and not by way of limitation, it is contemplated that the beam projection optics 30 can be structured to discriminate between the laterally distributed parasitic light 17 and the relatively high intensity spot 15 through selective reflection of the projected relatively high intensity spot 15, an example of which is illustrated in FIG. 3, selective transmission of the projected relatively high intensity spot 15, an example of which is illustrated by the introduction of a transmission aperture 50 in FIG. 4, or selective reflection or absorption of the projected parasitic light 17, an example of which is illustrated by the introduction of diverting reflectors/absorbers 52 in FIG. 5.

In the embodiment illustrated in FIG. 3, the beam projection optics 30 comprises a scanning mirror 34 sized and positioned to favor reflection of the relatively high intensity optical signals projected from the high intensity spot 15. Typically, the collimating lens 32 will be positioned far enough downstream of the output face of the wavelength conversion device 10 to ensure that collimated portions of the laterally distributed parasitic light 17 cannot be reflected by the scanning mirror 34. It is contemplated that the size and position of the scanning mirror 34 could be such that only the relatively high intensity optical signals are reflected by the scanning mirror 34, although some degree of crossover in the reflection of the parasitic light and the high intensity light could be tolerated.

Figure 4:
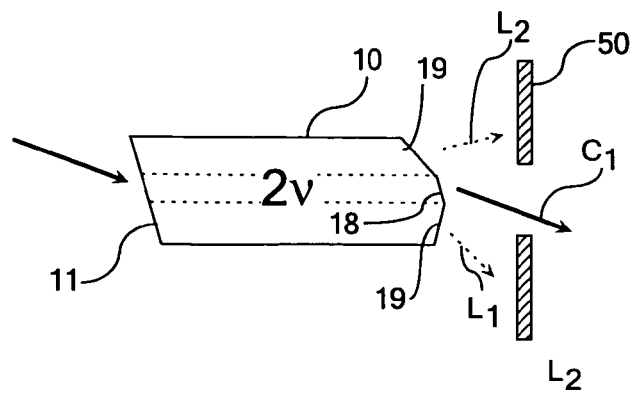
FIGS. 4-6 are schematic illustrations of some alternative wavelength conversion device configurations of a few embodiments of the present invention.
Figure 5:
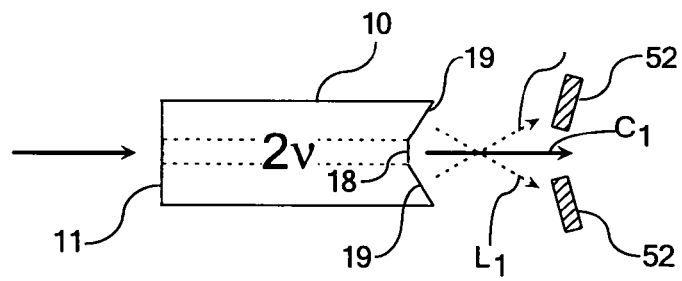
Figure 6:
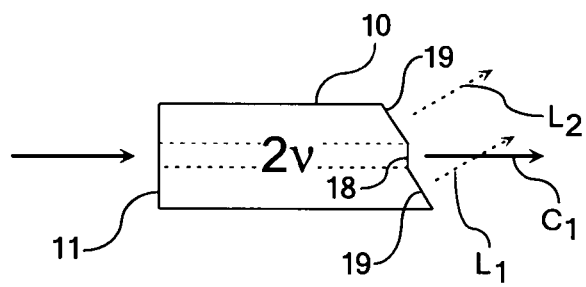
Figure 7A:
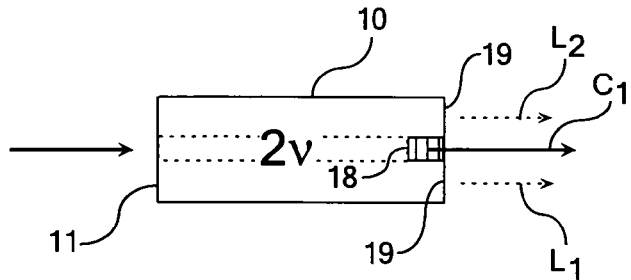
FIGS. 7A and 7B are top and side schematic illustrations of a further alternative wavelength conversion device configuration according to the present invention.
Figure 7B:
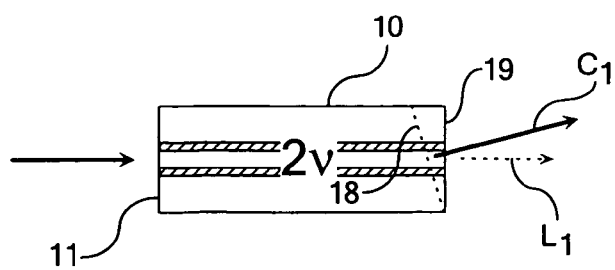

FIGS. 1 and 4-7 illustrate a number of contemplated alternative output face configurations, each of which comprises a core facet 18 and at least two lateral facets 19. In FIG. 4, the lateral and core facets 18, 19 are oriented relative to each other to define laterally diverging projections $L_1$, $L_2$, $C_1$ of the laterally distributed parasitic light and the relatively high intensity spot. In FIG. 5, the lateral and core facets 18, 19 are oriented to define laterally converging projections $L_1$, $L_2$, $C_1$. In FIG. 6, the lateral and core facets 18, 19 are oriented relative to each other to define parallel, co-planar projections $L_1$, $L_2$ that are angularly displaced from the projection $C_1$ of the relatively high intensity spot along a lateral dimension of the waveguide region. In FIGS. 7A and 7B, the lateral and core facets 18, 19 are also oriented relative to each other to define parallel, co-planar projections $L_1$, $L_2$ but the embodiment of FIGS. 7A and 7B differs from that of FIG. 6 in that the lateral and core facets 18, 19 are oriented to displace the co-planar projections $L_1$, $L_2$ of the laterally distributed parasitic light from the projection $C_1$ of the relatively high intensity spot along a vertical dimension of the waveguide region.

It is noted that reference herein to the "relatively linear" waveguide portion 12A of the waveguide region 12 is not intended to define the waveguide portion 12A as perfectly linear. Rather, it is recognized that the "relatively linear" waveguide portion 12A will necessarily define a two-dimensional cross section and, to this end, may be somewhat planar. Accordingly, in defining and describing the present invention it should be understood that the "relatively linear" waveguide portion 12A is linear in the sense that its lateral dimensions are much less significant than the lateral dimensions of the lateral planar waveguide portions 12B and some of the other components of the wavelength conversion device 10.

It is also noted that terms like "preferably," "commonly," and "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation. e.g., "substantially above zero," varies from a stated reference, e.g., "zero," and should be interpreted to require that the quantitative representation varies from the stated reference by a readily discernable amount.

It is also noted that recitations herein of a component of the present invention being "structured" or "configured" in a particular way, to embody a particular property, or function in a particular manner, are structural recitations as opposed to recitations of intended use. More specifically, the references herein to the manner in which a component is "structured" or "configured" denote an existing physical condition of the component and, as such, are to be taken as a definite recitation of the structural characteristics of the component.

It is to be understood that the preceding detailed description of the invention is intended to provide an overview or framework for understanding the nature and character of the invention as it is claimed. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A laser projection system comprising a laser source, a wavelength conversion device, and beam projection optics, wherein:
   the wavelength conversion device comprises an input face, and output face, and a waveguide region extending from the input face to the output face and confined between a pair of low index cladding layers;
   the waveguide region comprises a relatively linear waveguide portion and a pair of lateral planar waveguide portions;
   the output face of the wavelength conversion device comprises a multi-faceted output face comprising a core facet and at least two lateral facets;
   the waveguide region is structured such that an optical signal propagating from the input face to the output face along the waveguide region will define a relatively high intensity spot in substantial alignment with the relatively linear waveguide portion along the core facet of the output face and will be subject to a degree of scattering to define relatively low intensity laterally distributed parasitic light in substantial alignment with the lateral planar waveguide portions along the lateral facets of the output face;
   the lateral facets of the output face of the wavelength conversion device are oriented to project the relatively low intensity laterally distributed parasitic light in directions that are distinct from a direction in which the relatively high intensity spot is projected through the core facet; and
   the beam projection optics are structured to discriminate between the laterally distributed parasitic light and the relatively high intensity spot so as to favor projection of relatively high intensity optical signals towards an image field of the laser projection system.

2. A laser projection system as claimed in claim 1 wherein the lateral and core facets of the multi-faceted output face are oriented relative to each other to define laterally diverging projections of the laterally distributed parasitic light and the relatively high intensity spot.

3. A laser projection system as claimed in claim 1 wherein the lateral and core facets of the multi-faceted output face are oriented relative to each other to define laterally converging projections of the laterally distributed parasitic light and the relatively high intensity spot.

4. A laser projection system as claimed in claim 1 wherein the lateral and core facets of the multi-faceted output face are oriented relative to each other to define parallel, co-planar projections of the laterally distributed parasitic light.

5. A laser projection system as claimed in claim 4 wherein the lateral and core facets of the multi-faceted output face are oriented relative to each other such that the parallel, co-planar projections of the laterally distributed parasitic light are angularly displaced from the projection of the relatively high intensity spot along a lateral dimension of the waveguide region.

6. A laser projection system as claimed in claim 4 wherein the lateral and core facets of the multi-faceted output face are oriented relative to each other such that the parallel, co-planar projections of the laterally distributed parasitic light are angularly displaced from the projection of the relatively high intensity spot along a vertical dimension of the waveguide region.

7. A laser projection system as claimed in claim 1 wherein the beam projection optics are structured to discriminate between the laterally distributed parasitic light and the relatively high intensity spot through selective reflection of the projected relatively high intensity spot.

8. A laser projection system as claimed in claim 1 wherein the beam projection optics are structured to discriminate between the laterally distributed parasitic light and the relatively high intensity spot through selective transmission of the projected relatively high intensity spot.

9. A laser projection system as claimed in claim 1 wherein the beam projection optics are structured to discriminate between the laterally distributed parasitic light and the relatively high intensity spot through selective reflection of the projected parasitic light.

10. A laser projection system as claimed in claim 1 wherein the beam projection optics are structured to discriminate between the laterally distributed parasitic light and the relatively high intensity spot through selective absorption of the projected parasitic light.

11. A laser projection system as claimed in claim 1 wherein the beam projection optics comprises a scanning minor sized and positioned to favor reflection of the relatively high intensity optical signals.

12. A laser projection system as claimed in claim 11 wherein the beam projection optics comprises a scanning minor sized and positioned to reflect only the relatively high intensity optical signals.

13. A laser projection system as claimed in claim 11 wherein the beam projection optics further comprises a collimating lens positioned to collimate diverging or converging optical signals propagating from the output face of the wavelength conversion device.

14. A laser projection system as claimed in claim 13 wherein the collimating lens is positioned far enough downstream of the output face of the wavelength conversion device to ensure that collimated portions of the laterally distributed parasitic light cannot be reflected by the scanning mirror.

15. A wavelength conversion device comprising an input face, and output face, and a waveguide region, wherein:

the waveguide region extends from the input face to the output face and is confined between a pair of low index cladding layers;

the waveguide region comprises a relatively linear waveguide portion and a pair of lateral planar waveguide portions;

the output face of the wavelength conversion device comprises a multi-faceted output face comprising a core facet and at least two lateral facets;

the waveguide region is structured such that an optical signal propagating along the relatively linear waveguide portion of the waveguide region will be subject to a degree of scattering so as to define a relatively high intensity spot in substantial alignment with the relatively linear waveguide portion of the waveguide region along the core facet of the output face of the wavelength conversion device and relatively low intensity laterally distributed parasitic light in substantial alignment with the lateral planar waveguide portions of the waveguide region along the lateral facets of the output face of the wavelength conversion device;

the lateral facets of the output face of the wavelength conversion device are oriented to project the relatively low intensity laterally distributed parasitic light in directions that are distinct from a direction in which the relatively high intensity spot is projected through the core facet.

16. A wavelength conversion device as claimed in claim 15 wherein the lateral and core facets of the multi-faceted output face are oriented relative to each other to define laterally diverging projections of the laterally distributed parasitic light and the relatively high intensity spot.

17. A wavelength conversion device as claimed in claim 15 wherein the lateral and core facets of the multi-faceted output face are oriented relative to each other to define laterally converging projections of the laterally distributed parasitic light and the relatively high intensity spot.

18. A wavelength conversion device as claimed in claim 15 wherein the lateral and core facets of the multi-faceted output face are oriented relative to each other to define parallel, co-planar projections of the laterally distributed parasitic light and such that the parallel, co-planar projections of the laterally distributed parasitic light are angularly displaced from the projection of the relatively high intensity spot along a lateral dimension of the waveguide region.

19. A wavelength conversion device as claimed in claim 15 wherein the lateral and core facets of the multi-faceted output face are oriented relative to each other to define parallel, co-planar projections of the laterally distributed parasitic light and such that the parallel, co-planar projections of the laterally distributed parasitic light are angularly displaced from the projection of the relatively high intensity spot along a vertical dimension of the waveguide region.

20. A laser projection system comprising a laser source, a wavelength conversion device, and beam projection optics, wherein:

the wavelength conversion device comprises an input face, and output face, and a waveguide region extending from the input face to the output face and confined between a pair of low index cladding layers;

the waveguide region comprises a relatively linear waveguide portion and a pair of lateral planar waveguide portions;

the output face of the wavelength conversion device comprises a multi-faceted output face comprising a core facet and at least two lateral facets;

the waveguide region is structured such that an optical signal propagating along the relatively linear waveguide portion of the waveguide region will be subject to a degree of scattering so as to define a relatively high intensity spot in substantial alignment with the relatively linear waveguide portion of the waveguide region along the core facet of the output face of the wavelength conversion device and relatively low intensity laterally distributed parasitic light in substantial alignment with the lateral planar waveguide portions of the waveguide region along the lateral facets of the output face of the wavelength conversion device;

the lateral facets of the output face of the wavelength conversion device are oriented to project the relatively low intensity laterally distributed parasitic light in directions that are distinct from a direction in which the relatively high intensity spot is projected through the core facet;

the beam projection optics are structured to discriminate between the laterally distributed parasitic light and the relatively high intensity spot so as to favor projection of relatively high intensity optical signals towards an image field of the laser projection system;

the lateral and core facets of the multi-faceted output face are oriented relative to each other to define laterally diverging or laterally converging projections of the laterally distributed parasitic light and the relatively high intensity spot, or to define parallel co-planar projections of the laterally distributed parasitic light that are angularly displaced from the projection of the relatively high intensity spot along a lateral or vertical dimension of the waveguide region; and the beam projection optics are structured to discriminate between the laterally distributed parasitic light and the relatively high intensity spot through selective reflection or transmission of the projected relatively high intensity spot or through selective transmission, reflection, or absorption of the projected parasitic light.

* * * * *

UNITED STATES PATENT AND TRADEMARK OFFICE
CERTIFICATE OF CORRECTION

| | | |
|---|---|---|
| PATENT NO. | : 7,742,222 B2 | |
| APPLICATION NO. | : 12/072981 | |
| DATED | : June 22, 2010 | |
| INVENTOR(S) | : Jacques Gollier et al. | |

It is certified that error appears in the above-identified patent and that said Letters Patent is hereby corrected as shown below:

| Col. | Line | Description |
|---|---|---|
| 7 | 48 | Currently reads --the beam projection optics comprises a scanning minor sized--, should read --the beam projection optics comprises a scanning mirror sized-- |
| 7 | 53 | Currently reads --minor sized and positioned to reflect only the relatively high--, should read --mirror sized and positioned to reflect only the relatively high-- |

Signed and Sealed this
Twenty-third Day of August, 2011

David J. Kappos
*Director of the United States Patent and Trademark Office*